(12) United States Patent
Moorer

(10) Patent No.: US 8,161,166 B2
(45) Date of Patent: Apr. 17, 2012

(54) INFORMATION COMMUNICATION USING NUMERICAL RESIDUALS

(75) Inventor: James A. Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 792 days.

(21) Appl. No.: 12/014,702

(22) Filed: Jan. 15, 2008

(65) Prior Publication Data

US 2009/0182890 A1    Jul. 16, 2009

(51) Int. Cl.
*G06F 15/16* (2006.01)

(52) U.S. Cl. ....................................................... 709/227

(58) Field of Classification Search .................... 709/227
See application file for complete search history.

(56) References Cited

U.S. PATENT DOCUMENTS

| | | | | |
|---|---|---|---|---|
| 5,926,649 | A * | 7/1999 | Ma et al. ............................ | 710/6 |
| 6,667,993 | B1 * | 12/2003 | Lippett et al. .................. | 370/509 |
| 7,222,190 | B2 | 5/2007 | Klinker et al. | |
| 7,269,157 | B2 | 9/2007 | Klinker et al. | |
| 7,532,676 | B2 * | 5/2009 | Fonseka et al. ............... | 375/265 |
| 7,792,325 | B2 | 9/2010 | Rhoads et al. | |
| 7,831,718 | B2 | 11/2010 | Chapweske | |
| 2002/0010892 | A1 * | 1/2002 | Lodge et al. ................... | 714/777 |
| 2002/0110239 | A1 | 8/2002 | Venkatesan et al. | |
| 2006/0230162 | A1 * | 10/2006 | Chen et al. .................... | 709/229 |
| 2007/0124652 | A1 * | 5/2007 | Litsyn et al. .................. | 714/776 |
| 2007/0133420 | A1 | 6/2007 | Guven et al. | |
| 2007/0183515 | A1 * | 8/2007 | Lim et al. ....................... | 375/260 |
| 2007/0189517 | A1 | 8/2007 | Koseki et al. | |
| 2008/0069242 | A1 | 3/2008 | Xu et al. | |
| 2008/0112405 | A1 * | 5/2008 | Cholas et al. ................. | 370/389 |
| 2008/0232357 | A1 | 9/2008 | Chen | |
| 2008/0273458 | A1 | 11/2008 | Guo et al. | |
| 2008/0298579 | A1 * | 12/2008 | Abu-Amara .................... | 380/30 |
| 2009/0182890 | A1 | 7/2009 | Moorer | |
| 2011/0002554 | A1 | 1/2011 | Uslubas et al. | |

FOREIGN PATENT DOCUMENTS

| | | |
|---|---|---|
| WO | WO2005/091585 | 9/2005 |
| WO | WO2006/005334 | 1/2006 |

OTHER PUBLICATIONS

Zheng, X. et a., Chinese Remainder Theorem Based Group Key Management, Mar. 23-24, 2007, ACM, ACMSE 2007, pp. 1-6.*
Acharya, et al. "Dissemination-Based Data Delivery Using Broadcast Disks", IEEE Personal Communications, Dec. 1995, pp. 50-60.

(Continued)

*Primary Examiner* — Quang N. Nguyen
*Assistant Examiner* — Alicia Baturay
(74) *Attorney, Agent, or Firm* — Fish & Richardson P.C.

(57) ABSTRACT

Methods, systems, and apparatus, including medium-encoded computer program products, for imparting information. In general, one or more aspects of the subject matter described in this specification can be embodied in one or more methods that include receiving (e.g., in a peer-to-peer network) multiple sets of numerical residuals generated in accordance with multiple corresponding prime numbers; determining, based on the prime numbers, whether the sets of numerical residuals are sufficient to recover information encoded by the sets of numerical residuals; and recovering the information, when the sets of numerical residuals are sufficient, from at least a portion of the sets of numerical residuals using at least a portion of the prime numbers.

29 Claims, 2 Drawing Sheets

OTHER PUBLICATIONS

Alstrup, et al. "Introducing Octoshape—A New Technology for Large-Scale Streaming over the Internet", EBU Technical Review, Jul. 2005, 10 pages.

Bittorrent, "Technology: Peer Accelerated Content Delivery", downloaded from the internet at http://www.bittorrent.com/dna/technology.html, on Jan. 2, 2008, 3 pages.

Byers, et al. "A Digital Fountain Approach to Asynchronous Reliable Multicast", IEEE Journal on Selected Areas in Communication, vol. 20, Issue 8, Oct. 2002, pp. 1528-1540.

Goldreich, et al. "Chinese Remaindering with Errors", IEEE Transactions on Information Theory, vol. 46, Issue 4, Jul. 2000, pp. 1330-1338.

Knuth, The Art of Computer Programming, Second Edition, vol. 2: Seminumerical Algorithms, 1969, pp. 268-276 (11 pages).

Luby, "LT Codes", Proceedings of the $43^{rd}$ Symposium on Foundations of Computer Science, Nov. 2002, 10 pages.

Luby, et al. "Practical Loss-Resilient Codes" Proceedings of the Twenty-Ninth Annual ACM Symposium on Theory of Computing, 1997, 20 pages.

Kazaa, "How Peer-to-Peer (P2) and Kazaa Software Works", downloaded from the internet at http://www.kazaa.com/us/help/new_p2p.htm, on Jan. 2, 2008, 2 pages.

McKay, "Information Theory, Interference, and Learning Algorithms, Chapter 50: Digital Fountain Codes", Cambridge University Press, 2003, pp. 588-596.

Mitzenmacher, "Digital Fountains: A Survey and Look Forward", IEEE Information Theory Workshop, Oct. 2004, pp. 271-276.

Stone, "Multiple-Burst Error Correction with the Chinese Remainder Theorem", J. Soc. Indust. Appl. Math, vol. 11, No. 1, Mar. 1963, pp. 74-81.

Wikipedia, "Chinese Remainder Theoreum", downloaded from the internet at http://en.wikipedia.org/wiki/Chinese_remainder_theoreum on Jan. 3, 2008, 7 pages.

Lapidoth, "The Performance of Convolutional Codes on the Block Erasure Channel Using Various Finite Interleaving Techniques," Sep. 1994, IEEE Transactions on Information Theory 40(5): 1459-1473, 15 pages.

U.S. Patent Office, U.S. Appl. No. 12/100,348, filed Apr. 9, 2008, in Office Action mailed Apr. 12, 2011, 31 pages.

U.S. Patent Office, U.S. Appl. No. 12/100,348, filed Apr. 9, 2008, in Notice of Allowance mailed Sep. 20, 2011, 14 pages.

* cited by examiner

INFORMATION COMMUNICATION USING NUMERICAL RESIDUALS

BACKGROUND

This specification relates to communicating information, for example, distributing information in a peer-to-peer computer network.

Various approaches have been used to address the unreliability of underlying network infrastructure when distributing information over a network. For example, when sending information through the Internet using a protocol that is not guaranteed to be always reliable, such as the User Datagram Protocol (UDP), Digital Fountain Codes have been used to break up a stream into a number of sub-streams such that the original stream can be reconstructed from a minimum number of sub-streams. Thus, when a sending device is using a communications channel that can sometimes drop entire blocks of data, the receiving device can still reconstruct the original information even when some of the sub-streams are unavailable at the receiving device.

In addition, various approaches have been used to address server load concerns for media distribution over a network, where the traditional approach is to provide a large central server farm that supplies a separate stream to each client computer. For example, BitTorrent, Inc. of San Francisco, Calif., provides software that breaks up files to be transferred and delivers the files piece by piece from one or many different sources in a peer-to-peer (P2P) network, where a file to be downloaded from a server to a client may actually come from another client (a "peer") that already downloaded that file. Other P2P software includes Kazaa Software, available from Sharman Networks Ltd. of Port Vila, Vanuatu, and Octoshape Software, available from Octoshape Apps of Copenhagen, Denmark.

SUMMARY

This specification describes technologies relating to communicating information, for example, distributing information in a peer-to-peer computer network. In general, one or more aspects of the subject matter described in this specification can be embodied in one or more methods that include receiving multiple sets of numerical residuals generated in accordance with multiple corresponding prime numbers; determining, based on the prime numbers, whether the sets of numerical residuals are sufficient to recover information encoded by the sets of numerical residuals; and recovering the information, when the sets of numerical residuals are sufficient, from at least a portion of the sets of numerical residuals using at least a portion of the prime numbers. One or more aspects of the subject matter described in this specification can also be embodied in one or more methods that include processing information using multiple prime numbers to form corresponding sets of numerical residuals, wherein the information is recoverable using the sets of numerical residuals and the prime numbers; and sending the sets of numerical residuals to one or more recipients for recovery of the information, at the one or more recipients, from at least a portion of the sets of numerical residuals using at least a portion of the prime numbers. Other embodiments of these aspects include corresponding systems, apparatus, and computer program products encoded on computer-readable media and operable to cause data processing apparatus to perform the method operations.

These and other embodiments can optionally include one or more of the following features. The information can include at least a portion of a media stream, and the method can include: generating sub-streams from the media stream in accordance with corresponding prime numbers; and transmitting the sub-streams to peer devices in a peer-to-peer network. The generating can include: splitting the media stream into words; dividing each of the words by each of the prime numbers corresponding to the sub-streams to produce a remainder for each of the prime numbers for each of the words; and forming the sub-streams from the remainders. The prime numbers corresponding to the sub-streams can be the prime numbers corresponding to the sets of numerical residuals, and the recovering can include recovering the media stream by solving a set of equations defined by the prime numbers. Moreover, the prime numbers corresponding to the sub-streams can be different from the prime numbers corresponding to the sets of numerical residuals.

The recovering can include: selecting a proper subset of the sets of numerical residuals based on the prime numbers; and determining the information using the proper subset of the sets of numerical residuals and a corresponding proper subset of the prime numbers. The receiving, the determining and the recovering can be performed by a first computer, and the method can include: generating, at the first computer, numerical residuals in words of a first size; generating, at a second computer, numerical residuals in words of a second size, wherein the sets of numerical residuals received at the first computer include at least a portion of the numerical residuals in the words of the second size generated at the second computer; and recovering the information, at a third computer, using a proper subset of the words of the first size and a proper subset of the words of the second size. The method can include receiving decryption information including one or more indicators for the prime numbers. The prime numbers can include integers or other prime elements within a suitable number system.

In another aspect, a system includes a user interface device; and one or more computers operable to interact with the user interface device and to perform operations including: receiving multiple sets of numerical residuals generated in accordance with multiple corresponding prime numbers; determining, based on the prime numbers, whether the sets of numerical residuals are sufficient to recover information encoded by the sets of numerical residuals; and recovering the information, when the sets of numerical residuals are sufficient, from at least a portion of the sets of numerical residuals using at least a portion of the prime numbers. The one or more computers can include one personal computer, and the personal computer can include the user interface device. Furthermore, the system can include a computer network, wherein the information includes at least a portion of a media stream, and the operations further include: generating sub-streams from the media stream in accordance with corresponding prime numbers; and transmitting the sub-streams to peer devices in a peer-to-peer network.

Particular embodiments of the subject matter described in this specification can be implemented to realize one or more of the following advantages. Communication of information over a computer network can be improved. Information packets to be communicated can be broken up into words and encoded one word at a time, and the encoded words can be decoded on the receiving end in time that is linear in the packet size. Security for communicated information can be increased. Peer-to-peer distribution can be used, the capacity of peer nodes in the network can be improved, and the overall efficiency of the P2P network can be increased.

Peer-to-peer media distribution can be accomplished by breaking up a real-time media stream into separate, smaller streams that can be reassembled later, where the separate streams are generally interchangeable. The original stream can be reassembled from a selected subset of the smaller streams based on availability of the smaller streams at a given location. No particular order need be employed for the smaller streams, and a receiving device can use different selected subsets of the available sub-streams at different times, depending on sub-stream availability. Moreover, this can be done with reduced latency, which can provide significant improvements for real-time media distribution. Thus, the Internet can be efficiently used for real-time media distribution, such as sports broadcasts, live converts or live news coverage, where the main appeal of the media distribution is often its real-time nature.

Total bandwidth load on a server can be reduced. Thus, a server farm can be made less expensive to build and maintain for the same level of information distribution capabilities. Lower end computing devices can also be used as servers, making real-time streaming of programs over the Internet more affordable. For example, just a few computers can be used to deliver a real-time stream to a very large number of clients. Thus, the barriers to entry into the real-time streaming market can be lowered for small producers.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
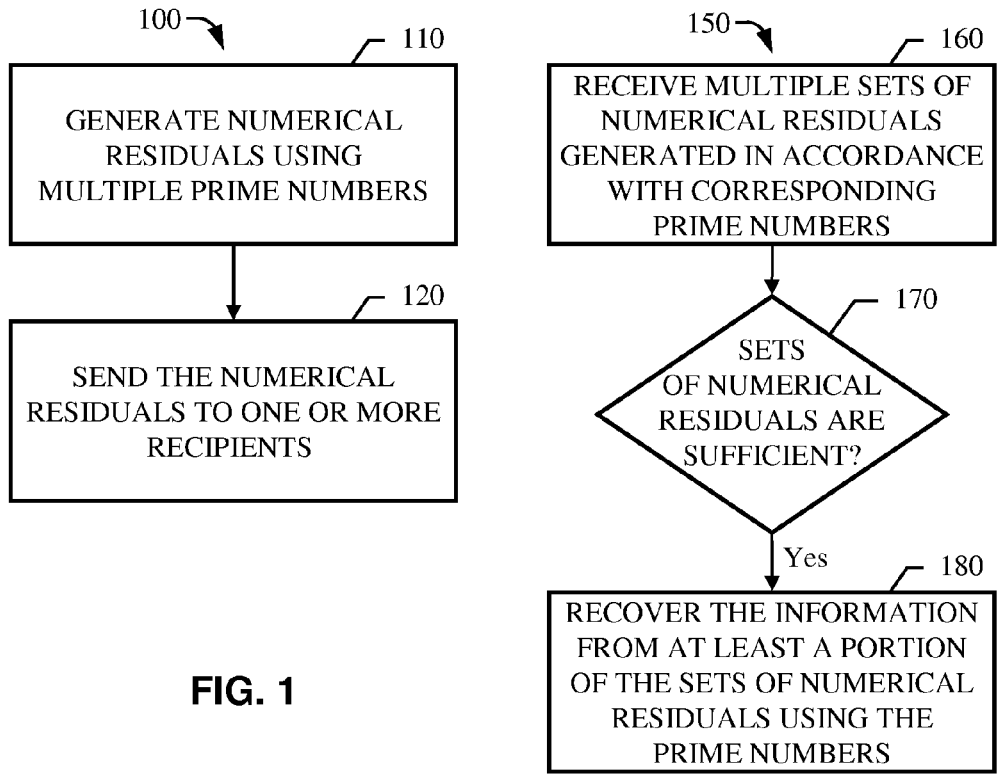
FIG. 1 shows an example method of communicating information.

FIG. 1 shows an example method of communicating information. A production process (100) includes generating numerical residuals, from information to be communicated, using multiple prime numbers (110). For example, the information can include at least a portion of a real-time media stream, and the generating can include generating sub-streams from the real-time media stream in accordance with corresponding prime numbers. The information can be divided by different prime numbers, and the remainders from this division by the respective prime numbers can be used to communicate the information over a computer network.

The production process (100) includes sending the numerical residuals to one or more recipients for recovery of the information at the one or more recipients (120). For example, the sub-streams can be transmitted to devices in a peer-to-peer network. The devices can reconstruct the information using the Chinese remainder theorem.

A consumption process (150) includes receiving multiple sets of numerical residuals generated in accordance with corresponding prime numbers (160). For example, the transmitted sub-streams can be received by both peer devices and client devices in the peer-to-peer network. As used herein, a "client" device is one that only receives information, whereas a "peer" device is one that both receives and sends information in a peer-to-peer network (i.e., a client computer that also acts as a server computer). It will be appreciated that in some implementations, all receiving devices can be peer devices, in which case, there are no pure client devices.

A check can be made, based on the prime numbers, as to whether the received sets of numerical residuals are sufficient to recover the information encoded by those numerical residuals (170). For example, when multiple sub-streams have been received (where each sub-stream was coded using a distinct prime number), a check can be made to see whether the product of the corresponding prime numbers is larger than can be represented in the target data word size being used to recover the information. Examples of this are described in further detail below. If the received sets of numerical residuals are sufficient, the information can be recovered from at least a portion of the sets of numerical residuals using the corresponding prime numbers (180).

Figure 2:
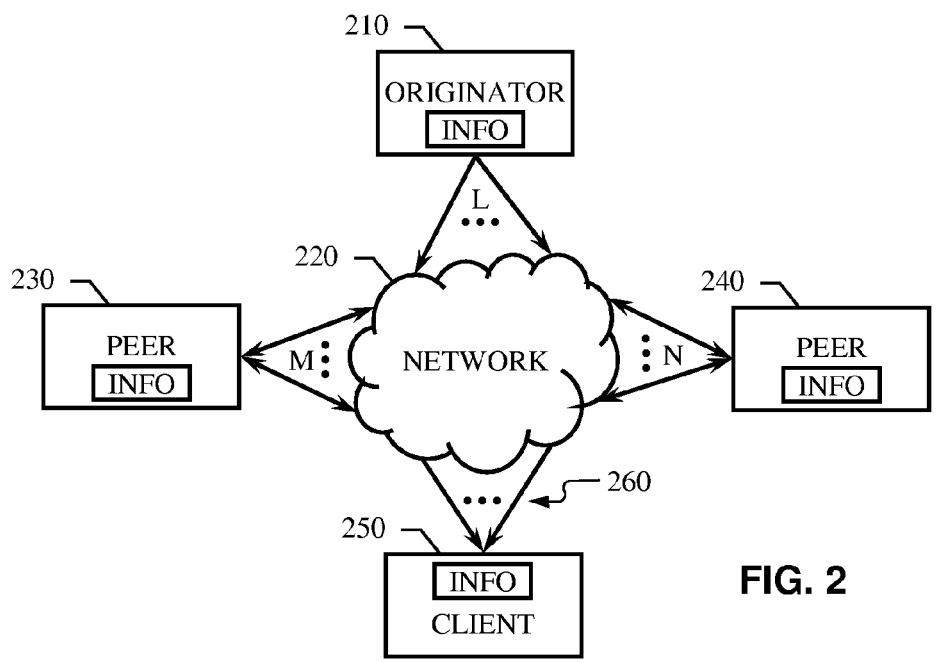
FIG. 2 shows an example media streaming system.

In a peer-to-peer network, the production process (100) can be performed by an originator of the information (e.g., a server computer providing a real-time media stream), the consumption process (150) can be performed by one or more client devices, and one or more peer devices can perform both the consumption process (150) and the production process (100). FIG. 2 shows an example media streaming system. An originator (210), such as a server computer or server farm, can generate L sub-streams from information to be distributed over a computer network (220). The L sub-streams can be generated from a real-time media stream, and the L sub-streams can be sent to multiple receiving devices, such as multiple peer devices connected to the originator (210) through different portions of the network (220).

A first peer device (230) can receive the L sub-streams, recover the information there from, and then generate M sub-streams from the recovered information. The M sub-streams can then be sent to multiple receiving devices over the network (220), including other peer devices and client devices. A second peer device (240) can receive the L sub-streams, the M sub-streams, or a combination of a portion of each. The second peer device (240) can also recover the information, and then generate N sub-streams from the recovered information. The N sub-streams can then be sent to multiple receiving devices over the network (220), including other peer devices and client devices.

A client device (250) can receive some combination (260) of the sub-streams and recover the information. The particular combination (260) of sub-streams can vary with network parameters, such as network topology and latency characteristics. In general, the client device (250) receives X of the L sub-streams, Y of the M sub-streams, and Z of the N sub-streams, where X, Y and Z are integers in the range $[0, \infty)$.

At each of the sub-stream generating devices (210, 230, 240), the original medial stream can be broken up into T non-identical, unique sub-streams, each of which has a bandwidth that is slightly greater than 1/T of the bandwidth of the original stream. The peer devices (230, 240) that receive and reconstruct the original stream can generate and transmit as many new sub-streams as appropriate, given the network limitations governing that device. For example, depending on how the peer device is connected to the network (e.g., by cable modem, Digital Subscriber Line (DSL), etc.) the number of sub-streams that a particular peer device can source can vary from peer to peer. Moreover, a particular peer device or client device can recover the original media stream from any appropriate combination of sub-streams, regardless of their source.

Figure 3:
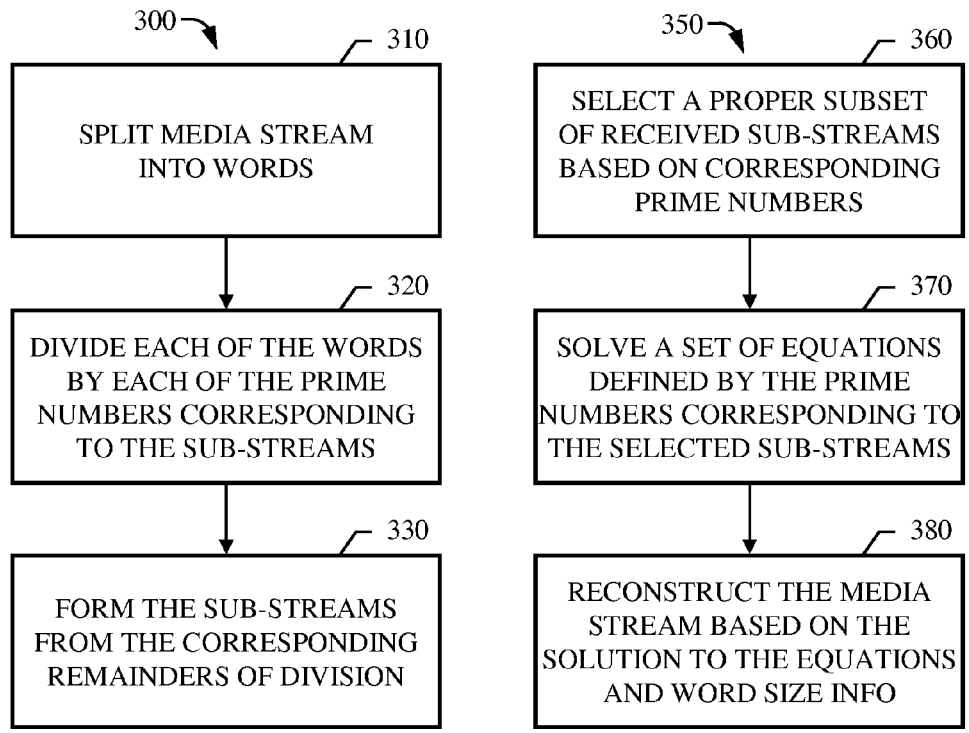
FIG. 3 shows an example method of distributing a media stream.

FIG. 3 shows an example method of distributing a media stream. A production process (300) can begin by splitting a media stream into words of a given size (310). The production process (300) can employ different word sizes at different generator devices. This can include different word sizes for splitting the media stream and different word sizes for remainder values to be sent in the sub-streams. For example, the capacity of the outgoing link for the generator device can govern word size(s) used.

Each of the words can be divided by each of the prime numbers corresponding to the sub-streams to be generated (320). In the detailed example now described, a word size of 256 bits is used. Each word from the media stream can be broken into T separate sub-streams. For example, T can be four, and dividing each 256-bit word by the respective four, 65-bit prime numbers generates respective remainders that are 64 bits wide. Note that even when four sub-streams are used to reconstruct the media stream, a particular generator device can generate more or fewer than four sub-streams from the media stream.

In general, a computer that is to source S sub-streams (where S is not necessarily equal to T) can choose S unique, 65-bit prime numbers: $P(1), P(2), \ldots, P(S)$. Each stream word, W, can be divided by the S prime numbers to produce S remainders: $R(1), R(2), \ldots, R(S)$. Each of these remainders can then be transmitted in respective sub-streams.

Thus, the sub-streams can be formed from the corresponding remainders of the division (330). In practice, additional overhead information can also be transmitted with each remainder value. Note however that this overhead cost can be reduced by increasing the number of remainder bits per transmitted word in the sub-streams. In addition, the prime numbers corresponding to the sub-streams can be transmitted as well, such as periodically (e.g., once a second), or these prime numbers can be communicated by other means, as discussed further below.

A consumption process (350) can include selecting a proper subset of received sub-streams based on corresponding prime numbers (360). A given receiver device can have access to different sub-streams from different generator devices. If sub-streams received from different sources use the same prime number, the receiving device can check for this and make sure that all of the sub-streams to be used have different prime numbers associated therewith. In some implementations, the receiving device can have access to many different sub-streams and can elect to receive a particular set of sub-streams, such as by actively requesting particular sub-streams from peer devices. The particular sub-streams that are requested can be governed by network factors, such as the capacity and latency of the respective links over which the sub-streams will be received.

In the example detailed above, any four available sub-streams can be selected to reconstruct the original word, W. The selected sub-streams need not come from the same source computer, and the selected sub-streams, $K(1), K(2), K(3)$ and $K(4)$, can be used along with their corresponding prime numbers, $J(1), J(2), J(3)$ and $J(4)$, to reconstruct the original word, W.

A set of equations, as defined by the prime numbers corresponding to the selected sub-streams, can be solved (370). For example, the set of equations can be as follows:

$$W=I(1)\times J(1)+K(1)$$

$$W=I(2)\times J(2)+K(2)$$

$$W=I(3)\times J(3)+K(3)$$

$$W=I(4)\times J(4)+K(4)$$

To reconstruct the original word, W, the integers, $I(1), I(2), I(3)$ or $I(4)$, can be found such that all four of the above equations hold true. Note that this is just a statement of what it means to be a remainder.

This set of equations can be solved using the Chinese remainder theorem. The original word, W, can be computed by finding any one of the integers, $I(1), I(2), I(3)$ or $I(4)$. The Chinese remainder theorem guarantees that there is a solution to these equations. Since the Chinese remainder theorem operates by construction, it shows exactly how to compute a solution as well.

The media stream can be reconstructed based on the solution to the set of equations and word size information (380). The solution to the above equations is not unique, in that multiples of $J(1) \times J(2) \times J(3) \times J(4)$ can be added to the solution and it will still be a solution to the simultaneous equations. However, since the size of the original word, W, is known, the solution that can be represented within that size word (e.g., 256 bits) is selected as the final solution. If the computed solution cannot fit into that size word, the value of $J(1) \times J(2) \times J(3) \times J(4)$ can be repeatedly subtracted from the obtained solution until it fits into the given word size.

With respect to generating the prime numbers, these can be generated using traditional techniques employed for public-private key encryption. Note that there is no shortage of 65-bit prime numbers; the prime number theorem states that there are at least three to the power of twelve of them. The prime numbers can be generated once, before the media distribution begins. Moreover, one or more unique numbers associated with the generator device (e.g., the processor identifier for the computer that is to source the data) can be used in producing the prime numbers to be used. Widely available software can be used to produce very large prime numbers. For example, the Integrated Performance Primitives (IPP) subroutine package, available from Intel Corporation of Santa Clara, Calif., includes a routine to test large numbers for primes.

As noted above, the number of sub-streams does not have to be four, and the word size does not have to be 256 bits. There is considerable freedom in choosing these parameters. The 256-bit words can be broken into two pieces or eight pieces, or originally 512-bit words or even 1024-bit words can be used. In general, the computational power required to do the multiple-precision arithmetic goes up roughly as the square of the number of bits in the word, so smaller word sizes are generally better; but larger word sizes provide more available prime numbers, which helps in having enough prime numbers to make sure they are all unique. Thus, the ultimate choice of word size can be based on the particular application and a tradeoff between the number of available primes desired and the computational load of doing the encoding and decoding.

In addition, sub-streams of unequal bandwidth can be used. If various sub-streams are available with word widths of B(i), the receiving device can select enough of the available sub-streams such that the sum of their word widths is greater or equal to the width of the original word. This is enough to guarantee that the Chinese remainder theorem algorithm can produce a solution.

The computation time for the Chinese remainder theorem is generally proportionate to the number of bits in the original word, which means the algorithm can be made relatively efficient. For example, streams that involve transform coding, such as MPEG (Moving Pictures Experts Group) or MP3 (MPEG Layer 3) streams, generally require Log 2 calculations per word, where the word lengths are typically much shorter than 256 bits. The presently described techniques are comparable computationally and can be readily run on modern home computers.

Figure 4:
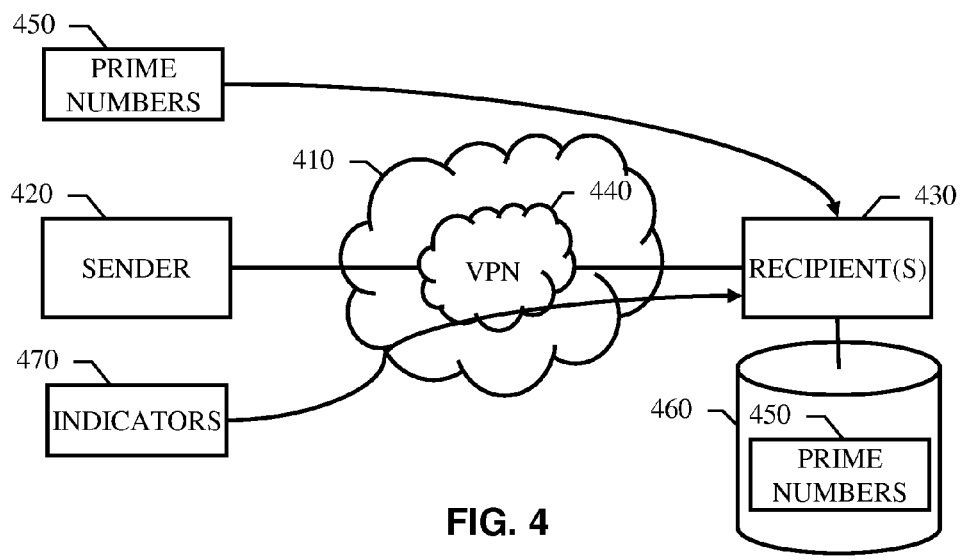
FIG. 4 shows an example information communication system including provision for information security.

Furthermore, rather than transmitting the prime numbers along with the sub-streams, as mentioned above, the prime numbers can be provided by other means, in an obfuscated fashion, or both. FIG. 4 shows an example information communication system including provision for information security. A computer network (410) provides a communication path for a sender device (420) to communicate with one or more recipient devices (430). For example, a sender (420) can communicate with a recipient (430) through a virtual private network (VPN) (440) that operates over the computer network (410). The prime numbers (450) that are to be used can be communicated to the recipient(s) (430) out of band from the information to be communicated. For example, the prime numbers (450) can be sent by a separate encrypted channel through the computer network (410) or outside of the computer network (410) entirely (e.g., my snail mail).

The prime numbers (450) can be saved in a database (460), which is accessible by a recipient (430). When sending the information to the recipient (430), multiple indicators (470) for the prime numbers (450) can be sent to the recipient (430) to identify the prime numbers (450) being used. For example, the indicators (470) can be index values into a table of prime numbers.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, although much of the description above relates to real-time media streaming, it will be appreciated that the systems and techniques described are also applicable to other forms of information communication and distribution, including traditional file downloads over the Internet.

For example, in another embodiment, the described techniques can be used to transmit a number as a watermark in video data. For example, if the number is a 256-bit number, and the video data allows 30 to 40 bits to be embedded into each frame as a watermark, without this embedded data being visible, the present techniques can be used to reduce the number of frames that need to be transmitted before the full 256-bit number can be recovered. For example, 128 prime numbers of length 25 bits can selected and built into the encoder and the decoder for the video data. To transmit data, each prime number can be used in turn to produce 128 25-bit remainders. Each 25-bit remainder can be transmitted, along with a 7-bit index value that identifies the prime number used, in a respective video frame. Then, at the decoding end, once 11 remainders (corresponding to different prime numbers) are received, the original 256-bit number can be recovered. Even if a substantial portion (e.g., 40%) of the watermark numbers cannot be recovered at the decoder, the original 256-bit number can still be recovered within a reasonable amount of time (e.g., about 36 video frames to have a 95% chance of getting 11 distinct numbers).

Moreover, the description above is provided within the context of standard integers, but the systems and techniques described can be implemented using other number systems since the Chinese remainder theorem can be implemented in other number systems as well. For example, the method can be implemented using any ring, R, that has (two-sided) ideals, Ij, that are coprime. "Ring", "ideal" and "coprime" are terms in mathematics with standard definitions. Integers are an example of a ring. A ring can also be made out of polynomials, out of 32-bit words, and other things, and the present systems and techniques can be applied using other rings. For example, a ring of polynomials over $GF(2)^n$ can be used for coding. These can be used to represent n-bit binary numbers. Thus, as used herein, the term "prime number" is not limited to integers, but rather encompasses any prime element within a suitable number system.

What is claimed is:

1. A computer-implemented method comprising:
receiving, at a computer in a peer-to-peer network, multiple sets of numerical residuals generated in accordance with multiple corresponding prime numbers;
determining, based on the prime numbers, whether the sets of numerical residuals are sufficient to recover information encoded by the sets of numerical residuals;
recovering the information, when the sets of numerical residuals are sufficient, from at least a portion of the sets of numerical residuals using at least a portion of the prime numbers; wherein the computer comprises a processor and one or more memory devices including a non-transitory tangible medium;
wherein the information comprises at least a portion of a media stream, the method comprising:
generating sub-streams from the media stream in accordance with corresponding prime numbers; and
transmitting the sub-streams to peer devices in the peer-to-peer network.

2. The method of claim 1, wherein the generating comprises:
splitting the media stream into words;
dividing each of the words by each of the prime numbers corresponding to the sub-streams to produce a remainder for each of the prime numbers for each of the words; and
forming the sub-streams from the remainders.

3. The method of claim 1, wherein the prime numbers corresponding to the sub-streams are the prime numbers corresponding to the sets of numerical residuals, and the recovering comprises recovering the media stream by solving a set of equations defined by the prime numbers.

4. The method of claim 1, wherein the prime numbers corresponding to the sub-streams are different from the prime numbers corresponding to the sets of numerical residuals.

5. The method of claim 1, wherein the recovering comprises:
selecting a proper subset of the sets of numerical residuals based on the prime numbers; and
determining the information using the proper subset of the sets of numerical residuals and a corresponding proper subset of the prime numbers.

6. The method of claim 1, wherein the receiving, the determining and the recovering are performed by a first computer, and the method comprises:
generating, at the first computer, numerical residuals in words of a first size;
generating, at a second computer, numerical residuals in words of a second size, wherein the sets of numerical residuals received at the first computer comprise at least a portion of the numerical residuals in the words of the second size generated at the second computer; and
recovering the information, at a third computer, using a proper subset of the words of the first size and a proper subset of the words of the second size.

7. The method of claim 1, further comprising receiving decryption information comprising one or more indicators for the prime numbers.

8. The method of claim 1, wherein the prime numbers comprise integers.

9. A non-transitory computer-readable medium encoding a computer program product operable to cause data processing apparatus to perform operations comprising:
receiving, in a peer-to-peer network, multiple sets of numerical residuals generated in accordance with multiple corresponding prime numbers;
determining, based on the prime numbers, whether the sets of numerical residuals are sufficient to recover information encoded by the sets of numerical residuals;
recovering the information, when the sets of numerical residuals are sufficient, from at least a portion of the sets of numerical residuals using at least a portion of the prime numbers;
wherein the information comprises at least a portion of a media stream, the operations comprising:
generating sub-streams from the media stream in accordance with corresponding prime numbers; and
transmitting the sub-streams to peer devices in the peer-to-peer network.

10. The non-transitory computer-readable medium of claim 9, wherein the generating comprises:
splitting the media stream into words;
dividing each of the words by each of the prime numbers corresponding to the sub-streams to produce a remainder for each of the prime numbers for each of the words; and
forming the sub-streams from the remainders.

11. The non-transitory computer-readable medium of claim 9, wherein the prime numbers corresponding to the sub-streams are the prime numbers corresponding to the sets of numerical residuals, and the recovering comprises recovering the media stream by solving a set of equations defined by the prime numbers.

12. The non-transitory computer-readable medium of claim 9, wherein the prime numbers corresponding to the sub-streams are different from the prime numbers corresponding to the sets of numerical residuals.

13. The non-transitory computer-readable medium of claim 9, wherein the recovering comprises:
selecting a proper subset of the sets of numerical residuals based on the prime numbers; and
determining the information using the proper subset of the sets of numerical residuals and a corresponding proper subset of the prime numbers.

14. The non-transitory computer-readable medium of claim 9, wherein the receiving, the determining and the recovering are performed by a first computer, and the operations comprise:
generating, at the first computer, numerical residuals in words of a first size;
generating, at a second computer, numerical residuals in words of a second size, wherein the sets of numerical residuals received at the first computer comprise at least a portion of the numerical residuals in the words of the second size generated at the second computer; and
recovering the information, at a third computer, using a proper subset of the words of the first size and a proper subset of the words of the second size.

15. The non-transitory computer-readable medium of claim 9, the operations further comprising receiving decryption information comprising one or more indicators for the prime numbers.

16. The non-transitory computer-readable medium of claim 9, wherein the prime numbers comprise integers.

17. A system comprising:
a computer network;
a user interface device; and
one or more computers operable to interact with the user interface device and to perform operations comprising:
receiving, in a peer-to-peer network operated over the computer network, multiple sets of numerical residuals generated in accordance with multiple corresponding prime numbers;
determining, based on the prime numbers, whether the sets of numerical residuals are sufficient to recover information encoded by the sets of numerical residuals; recovering the information, when the sets of numerical residuals are sufficient, from at least a portion of the sets of numerical residuals using at least a portion of the prime numbers;
wherein the information comprises at least a portion of a media stream, and the operations further comprising:
generating sub-streams from the media stream in accordance with corresponding prime numbers; and
transmitting the sub-streams to peer devices in the peer-to-peer network.

18. The system of claim 17, wherein the one or more computers comprises one personal computer, and the personal computer comprises the user interface device.

19. The system of claim 17, wherein the generating comprises:
splitting the media stream into words;
dividing each of the words by each of the prime numbers corresponding to the sub-streams to produce a remainder for each of the prime numbers for each of the words; and
forming the sub-streams from the remainders.

20. The system of claim 17, wherein the prime numbers corresponding to the sub-streams are the prime numbers corresponding to the sets of numerical residuals, and the recovering comprises recovering the media stream by solving a set of equations defined by the prime numbers.

21. The system of claim 17, wherein the prime numbers corresponding to the sub-streams are different from the prime numbers corresponding to the sets of numerical residuals.

22. The system of claim 17, wherein the recovering comprises:
selecting a proper subset of the sets of numerical residuals based on the prime numbers; and
determining the information using the proper subset of the sets of numerical residuals and a corresponding proper subset of the prime numbers.

23. The system of claim 17, wherein the one or more computers comprise a first computer to perform the receiving, the determining and the recovering, and the one or more computers comprise a second computer, the operations comprising:
generating, at the first computer, numerical residuals in words of a first size;
generating, at the second computer, numerical residuals in words of a second size, wherein the sets of numerical residuals received at the first computer comprise at least a portion of the numerical residuals in the words of the second size generated at the second computer; and
recovering the information, at a third computer, using a proper subset of the words of the first size and a proper subset of the words of the second size.

24. The system of claim 17, the operations further comprising receiving decryption information comprising one or more indicators for the prime numbers.

25. The system of claim 17, wherein the prime numbers comprise integers.

26. A computer-implemented method comprising:
processing, at a computer, information comprising at least a portion of a media stream using multiple prime numbers to form corresponding sets of numerical residuals and to generate sub-streams from the media stream in accordance with the prime numbers, wherein the information is recoverable using the sets of numerical residuals and the prime numbers; and
transmitting the sub-streams, including the sets of numerical residuals, to peer devices in a peer-to-peer network for recovery of the information, at the peer devices, from at least a portion of the sets of numerical residuals using at least a portion of the prime numbers;
wherein the computer comprises a processor and one or more memory devices including a non-transitory tangible medium.

27. The method of claim 26, wherein the processing comprises:
splitting the media stream into words;
dividing each of the words by each of the prime numbers corresponding to the sub-streams to produce a remainder for each of the prime numbers for each of the words; and
forming the sub-streams from the remainders.

28. A non-transitory computer-readable medium encoding a computer program product operable to cause data processing apparatus to perform operations comprising:
processing information comprising at least a portion of a media stream using multiple prime numbers to form corresponding sets of numerical residuals and to generate sub-streams from the media stream in accordance with the prime numbers, wherein the information is recoverable using the sets of numerical residuals and the prime numbers; and
transmitting the sub-streams, including the sets of numerical residuals, to peer devices in a peer-to-peer network for recovery of the information, at the peer devices, from at least a portion of the sets of numerical residuals using at least a portion of the prime numbers.

29. The non-transitory computer-readable medium of claim 28, wherein the processing comprises:
splitting the media stream into words;
dividing each of the words by each of the prime numbers corresponding to the sub-streams to produce a remainder for each of the prime numbers for each of the words; and
forming the sub-streams from the remainders.

* * * * *